(12) United States Patent
Codilian et al.

(10) Patent No.: US 6,995,933 B1
(45) Date of Patent: Feb. 7, 2006

(54) DISK DRIVE FOR OPTIMIZING WRITE CURRENT SETTINGS RELATIVE TO DRIVE OPERATING CHARACTERISTICS AND AMBIENT TEMPERATURE READINGS

(75) Inventors: Raffi Codilian, Irvine, CA (US); Iftikhar A. Baqai, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 260 days.

(21) Appl. No.: 10/136,760

(22) Filed: Apr. 30, 2002

(51) Int. Cl.
*G11B 5/09* (2006.01)
*G11B 5/02* (2006.01)
(52) U.S. Cl. .......................................... 360/46; 360/68
(58) Field of Classification Search .................. 360/46, 360/66
See application file for complete search history.

(56) References Cited

U.S. PATENT DOCUMENTS

| | | | |
|---|---|---|---|
| 5,121,262 A | 6/1992 | Squires et al. | |
| 5,784,296 A | 7/1998 | Baker et al. | |
| 6,005,731 A | 12/1999 | Foland, Jr. et al. | |
| 6,101,053 A * | 8/2000 | Takahashi | 360/46 |
| 6,118,614 A | 9/2000 | Lee | |
| 6,188,531 B1 | 2/2001 | Chang et al. | |
| 6,252,731 B1 * | 6/2001 | Sloan et al. | 360/31 |
| 6,369,972 B1 | 4/2002 | Codilian et al. | |
| 6,744,578 B1 * | 6/2004 | Bishop | 360/31 |

* cited by examiner

*Primary Examiner*—David Hudspeth
*Assistant Examiner*—Daniel L. Negrón
(74) *Attorney, Agent, or Firm*—Howard H. Sheerin, Esq.

(57) ABSTRACT

A disk drive is disclosed for optimizing write current settings relative to drive operating characteristics and a plurality of ambient temperature readings. Test data is written to and read from the disk to generate quality metrics that are evaluated to generate an optimized write current setting for each ambient temperature reading. In one embodiment, the optimized write current settings are derived during manufacturing and used in-the-field during normal operation. In another embodiment, the optimized write current settings are re-optimized in-the-field to compensate for changes in the drive operating characteristics that occur over time (e.g., environmental changes and electrical and mechanical changes).

26 Claims, 6 Drawing Sheets

| TEMP READING | OPTIMIZED SETTING | POSSIBLE SETTINGS |
|---|---|---|
| TEMP 1 | X | SETTING Ti1-1<br>SETTING Ti1-2<br>SETTING Ti1-3<br>SETTING Ti1-4<br>SETTING Ti1-5<br>SETTING Ti1-6<br>SETTING Ti1-7<br>SETTING Ti1-8<br>SETTING Ti1-9<br>SETTING Ti1-10 |
| TEMP 2 | X | SETTING Ti2-1<br>SETTING Ti2-2<br>SETTING Ti2-3<br>SETTING Ti2-4<br>SETTING Ti2-5<br>SETTING Ti2-6<br>SETTING Ti2-7<br>SETTING Ti2-8<br>SETTING Ti2-9<br>SETTING Ti2-10 |
| . . . | . . . | . . . |
| TEMP N | X | SETTING TiN-1<br>SETTING TiN-2<br>SETTING TiN-3<br>SETTING TiN-4<br>SETTING TiN-5<br>SETTING TiN-6<br>SETTING TiN-7<br>SETTING TiN-8<br>SETTING TiN-9<br>SETTING TiN-10 |

DISK DRIVE FOR OPTIMIZING WRITE CURRENT SETTINGS RELATIVE TO DRIVE OPERATING CHARACTERISTICS AND AMBIENT TEMPERATURE READINGS

CROSS REFERENCE TO RELATED APPLICATIONS AND PATENTS

This application is related to U.S. Pat. No. 6,369,972 entitled "TEMPERATURE MONITORING METHOD OF A DISK DRIVE VOICE COIL MOTOR FROM A TRAVELED DISTANCE" the disclosure of which is incorporated herein by reference.

BACKGROUND OF THE INVENTION

1. Field of the Invention

The present invention relates to disk drives for computer systems. More particularly, the present invention relates to a disk drive optimizing write current settings relative to drive operating characteristics and ambient temperature readings.

2. Description of the Prior Art

The prior art has suggested to compute nominal write current settings over a plurality of ambient temperatures relative to the coercivity of the media used for a plurality of disk drives in a product line. Typically a lower write current is used for higher ambient temperatures to help minimize inter-track interference, whereas a higher write current is used for lower ambient temperatures to ensure the media saturates. During normal "in-the-field" operation, a write driver circuit is programmed with the appropriate nominal write current setting relative to the ambient temperature of the disk drive. However, computing nominal write current settings relative to the coercivity of the media may not provide the optimal write current settings for each ambient temperature. Further, using static, nominal write current settings does not compensate for changes in the drive operating characteristics occurring over time while in-the-field (e.g., environmental changes and electrical and mechanical changes).

There is, therefore, a need to better optimize the write current in a disk drive relative to drive operating characteristics and the ambient temperature.

SUMMARY OF THE INVENTION

The present invention may be regarded as a disk drive having drive operating characteristics and comprising a disk and a head actuated radially over the disk. A programmable write driver applies a write current to the head during write operations. During a write current optimization procedure, the write driver is programmed with a first write current setting relating to an ambient temperature reading. Test data is written to the disk and read from the disk to generate a first quality metric. The write driver is programmed with a second write current setting relating to the ambient temperature reading. Test data is written to the disk and read from the disk to generate a second quality metric. The first and second quality metrics are evaluated to generate an optimized write current setting based on the drive operating characteristics and the ambient temperature reading.

In one embodiment, the disk drive comprises a temperature sensor for obtaining the ambient temperature reading. In another embodiment, the ambient temperature reading is obtained by executing a temperature sensing algorithm.

In one embodiment, the write current optimization procedure is executed during a manufacturing process.

In one embodiment, the write current optimization procedure is executed for a plurality of different temperature readings to generate a plurality of corresponding optimized write current settings.

In one embodiment, the optimized write current setting is used to generate a re-optimized write current setting for each of a plurality of disk drives. In one embodiment, the write current optimization procedure is executed for a plurality of different temperature readings to generate a plurality of corresponding optimized write current settings. The plurality of optimized write current settings are re-optimized for each of a plurality of disk drives. In one embodiment, the plurality of optimized write current settings are generated in a temperature controlled environment and the plurality of re-optimized write current settings are generated for each of the plurality of disk drives in a non-temperature controlled environment.

In one embodiment, the disk drive comprises a semiconductor memory for storing optimized write current settings, the write current optimization procedure is executed in-the-field based on the drive operating characteristics at the time the write current optimization procedure is executed, and the optimized write current setting generated by the write current optimization procedure is used to re-optimize at least one of the optimized write current settings stored in the semiconductor memory. In one embodiment, the write current optimization procedure is executed in-the-field during an idle mode of the disk drive.

In one embodiment, the first write current setting is selected relative to a previously optimized write current setting that corresponds to the ambient temperature reading. In another embodiment, the write current optimization procedure is executed for more than two write current settings.

In one embodiment, the disk drive comprises a sampling device for sampling a read signal emanating from the head while reading the test data from the disk to generate read signal sample values. The quality metrics comprise a mean squared error measurement generated relative to the read signal sample values and expected sample values.

In one embodiment, the quality metrics comprise bit errors in an estimated data sequence detected from a read signal emanating from the head while reading the test data from the disk.

The present invention may also be regarded as a method of executing a write current optimization procedure for a disk drive having drive operating characteristics, the disk drive comprising a disk, a head actuated radially over the disk, and a programmable write driver for applying a write current to the head during write operations. The write driver is programmed with a first write current setting relating to an ambient temperature reading. Test data is written to and read from the disk to generate a first quality metric. The write driver is programmed with a second write current setting relating to the ambient temperature reading. Test data is written to and read from the disk to generate a second quality metric. The first and second quality metrics are evaluated to generate an optimized write current setting based on the drive operating characteristics and the ambient temperature reading.

DESCRIPTION OF THE PREFERRED EMBODIMENTS

Figures 1A, 1B:
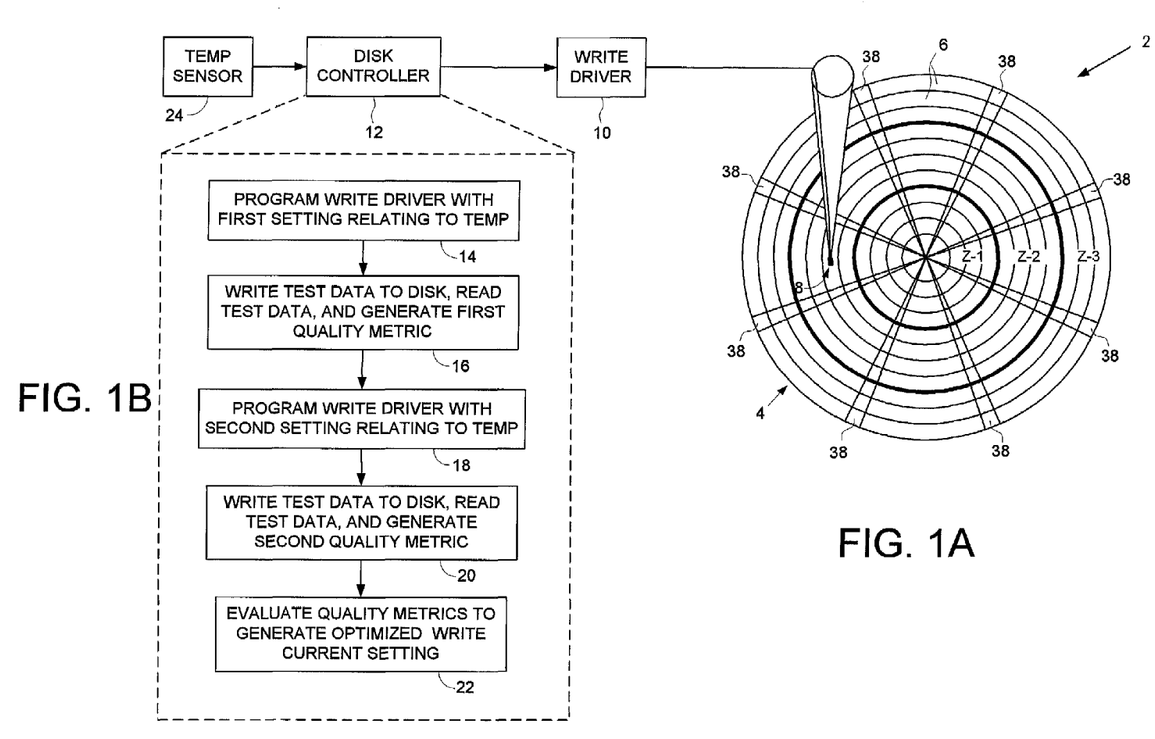
FIG. 1A shows a disk drive according to an embodiment of the present invention comprising a programmable write driver and a disk controller responsive to a temperature sensor for optimizing write current settings for the write driver.
FIG. 1B shows the steps executed by the disk controller to optimize the write current settings according to an embodiment of the present invention.

FIG. 1A shows a disk drive 2 according to an embodiment of the present invention having drive operating characteristics and comprising a disk 4 and a head 8 actuated radially over the disk 4. A programmable write driver 10 applies a write current to the head 8 during write operations. A disk controller 12 executes a write current optimization procedure shown in FIG. 1B, wherein at step 14 the write driver 10 is programmed with a first write current setting relating to an ambient temperature reading. At step 16 test data is written to the disk 4 and read from the disk 4 to generate a first quality metric. At step 18 the write driver 10 is programmed with a second write current setting relating to the ambient temperature reading. At step 20 test data is again written to the disk 4 and read from the disk 4 to generate a second quality metric. At step 22 the first and second quality metrics are evaluated to generate an optimized write current setting based on the drive operating characteristics and the ambient temperature reading.

In the embodiment shown in FIG. 1A, the disk drive 2 comprises a temperature sensor 24 for obtaining the ambient temperature reading. In an alternative embodiment, the disk controller 12 executes a temperature sensing algorithm to obtain the ambient temperature reading. An example temperature sensing algorithm may correlate seek distances with ambient temperature similar to the method disclosed in the above-identified patent application entitled "TEMPERATURE MONITORING METHOD OF A DISK DRIVE VOICE COIL MOTOR FROM A TRAVELED DISTANCE".

In one embodiment, the ambient temperature reading is obtained while executing the write current optimization procedure during manufacturing. In an alternative embodiment, the temperature sensor 24 generates the ambient temperature reading for the disk drive 2 while executing the write current optimization procedure in-the-field. The optimized write current settings are stored in a semiconductor memory. Executing the write current optimization procedure in-the-field to re-optimize the write current settings compensates for changes in the drive operating characteristics that occur over time due to environmental changes (e.g., changes in humidity, altitude, etc.) as well as electrical and mechanical changes (e.g., changes in the head resistance, head fly height, structural resonances, etc.).

Figure 2:
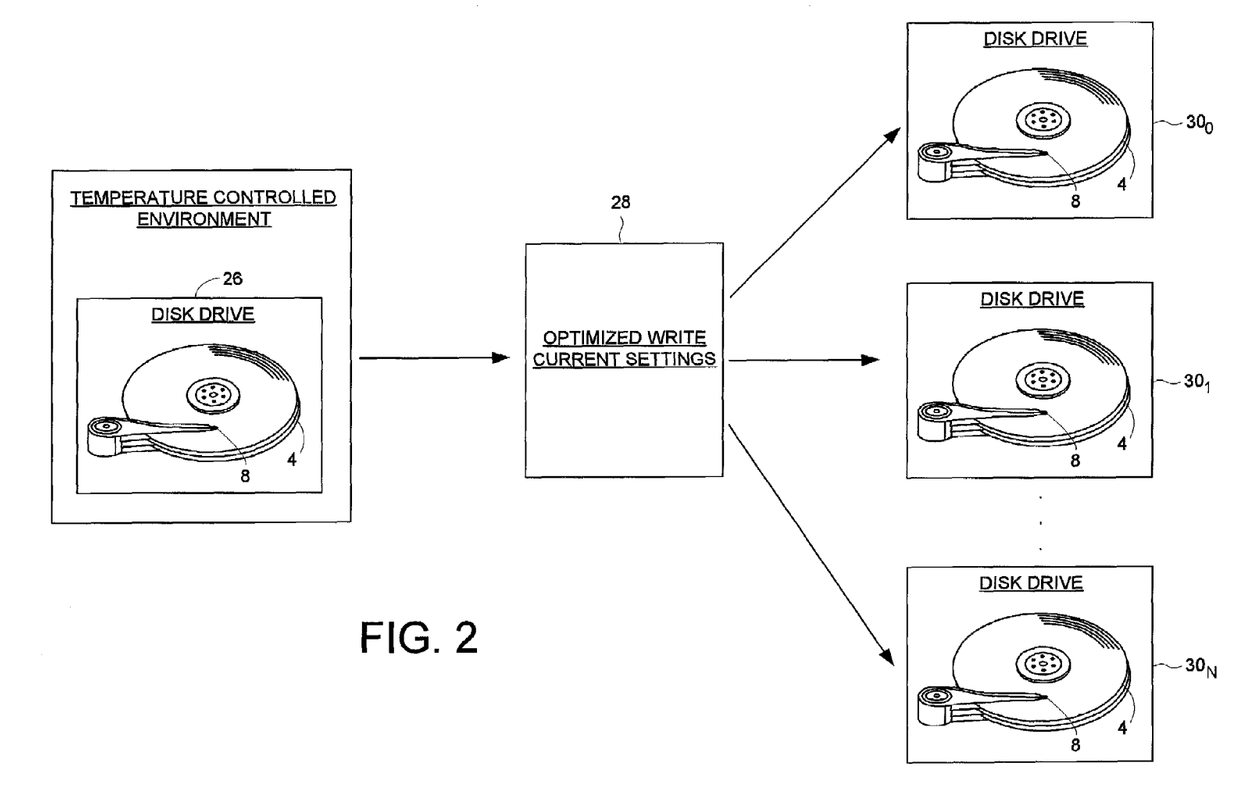
FIG. 2 shows an embodiment of the present invention wherein the write current optimization procedure is executed in a temperature controlled environment and the resulting optimized write current settings are re-optimized for a product line of disk drives in a non-temperature controlled environment.

In one embodiment, each disk drive individually performs the write current optimization procedure, and in an alternative embodiment, a subset of disk drives within a product line execute the write current optimization procedure to generate a plurality of optimized write current settings that are re-optimized for each disk drive in the product line. The latter embodiment is illustrated in FIG. 2 wherein a disk drive 26 within a product line executes the write current optimization procedure for a plurality of different temperature readings in a temperature controlled environment to generate a plurality of optimized write current settings 28. The optimized write current settings 28 are then re-optimized for a plurality of disk drives $30_0$–$30_N$ in the product line.

In one embodiment, each disk drive $30_i$ in the product line performs the write current optimization procedure in order to re-optimize the write current settings 28 for each individual disk drive $30_i$. That is, the optimized write current settings 28 are treated as default settings which are re-optimized for each disk drive $30_i$ by executing the write current optimization procedure for a plurality of different temperature readings. In one embodiment, each disk drive $30_i$ in the product line executes the write current optimization procedure during a manufacturing process in a temperature controlled environment, and in alternative embodiment, each disk drive $30_i$ executes the write current optimization procedure while in-the-field using the current ambient temperature reading for the current drive operating characteristics.

Figure 3:
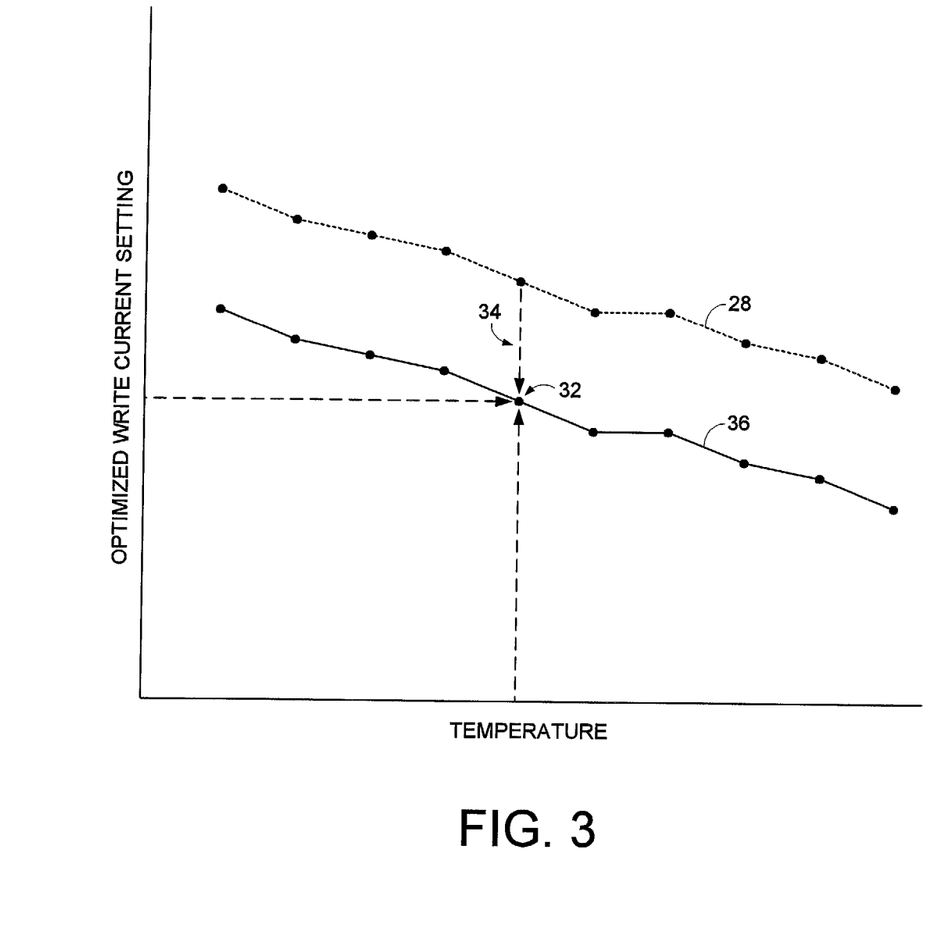
FIG. 3 illustrates that in one embodiment the optimized write current settings are adjusted by an offset relative to a write current setting optimized by each of the product line of disk drives.

In an alternative embodiment, each disk drive $30_i$ in the product line executes the write current optimization procedure in a non-temperature controlled environment to generate an optimized write current setting for the current ambient temperature reading. The optimized write current settings 28 are then re-optimized for each disk drive $30_i$ by adjusting the optimized write current settings 28 by a corresponding offset 34 as illustrated in FIG. 3 which shows the calibrated write current settings 28 for a plurality of ambient temperature readings. A disk drive $30_i$ in the product line executes the write current optimization procedure for a current ambient temperature reading to generate a drive specific optimized write current setting 32. The optimized write current settings 28 are then adjusted by the offset 34 to generate a plurality of re-optimized write current settings 36 for each disk drive $30_i$ in the product line. An advantage of this embodiment is that while the optimized write current settings 28 are generated in a temperature controlled environment at multiple temperature settings for a small subset of disk drives (even one), the re-optimized write current settings for each of the disk drives $30_0$–$30_N$ in the product line are generated in a non-temperature controlled environment where temperature is relatively constant.

The disk 4 in FIG. 1A comprises a plurality of radially spaced, concentric data tracks 6 each comprising a plurality of data sectors and embedded servo sectors 38. The data tracks 6 are banded together to form a plurality of zones (Z1–Z3). The data rate is increased from the inner diameter zone Z1 to the outer diameter zone Z3 in order to achieve a more constant linear bit density, thereby achieving higher capacity. In one embodiment, a data sector is reserved in each zone for writing and reading the test data during the write current optimization procedure, and a plurality of write current settings are optimized for each zone. During normal operation the write driver 10 is programmed with the optimized write current setting corresponding to the current zone and the current ambient temperature reading.

Figure 4:
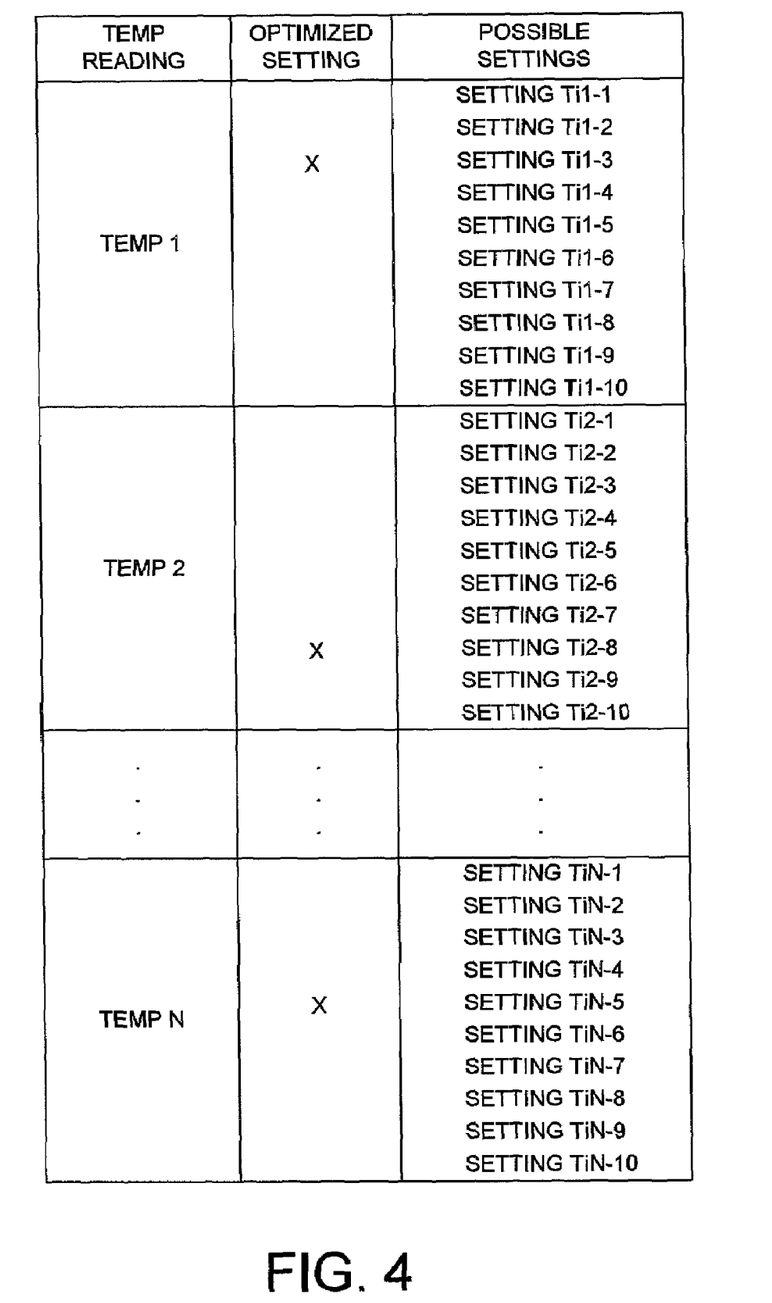
FIG. 4 shows a table of write current settings relating to a plurality of ambient temperature readings for use in programming the write driver during the write current optimization procedure.

FIG. 4 shows a table of write current settings for a plurality of temperature readings TEMP 1–TEMP N wherein the write driver 10 is programmed with a plurality of the write current settings relating to the ambient temperature reading during the write current optimization procedure. The write current settings shown in FIG. 4 are not necessarily stored by the disk drive 2 but may be computed by the disk controller 12. For example, the disk controller 12 may select a starting write current setting (e.g., the current optimized write current setting) and then generate a plurality of write current settings by incrementing/decrementing the starting write current setting by a predetermined delta (e.g., one milliamp). In this manner the write driver 10 is programmed over a range of write current settings relative to the starting write current setting.

In one embodiment, during the write current optimization procedure a quality metric is generated for each of the possible write current settings relating to the ambient temperature reading. In another embodiment, a quality metric is generated over a subset of the write current settings proximate the current optimized write current setting. For example, in FIG. 4 if the ambient temperature reading corresponds to TEMP 1, the optimization procedure may generate a quality metric for a subset of write current settings proximate to the current optimized write current setting Ti1-3 (e.g., write current settings Ti1-1 to Ti1-5). This embodiment may be more efficient, particularly if the number of possible write current settings is very large. In one embodiment, the optimization procedure is periodically executed over the entire set of possible write current settings for a given ambient temperature reading to ensure the optimal setting does not fall outside the subset surrounding the current optimized setting.

Figure 5:
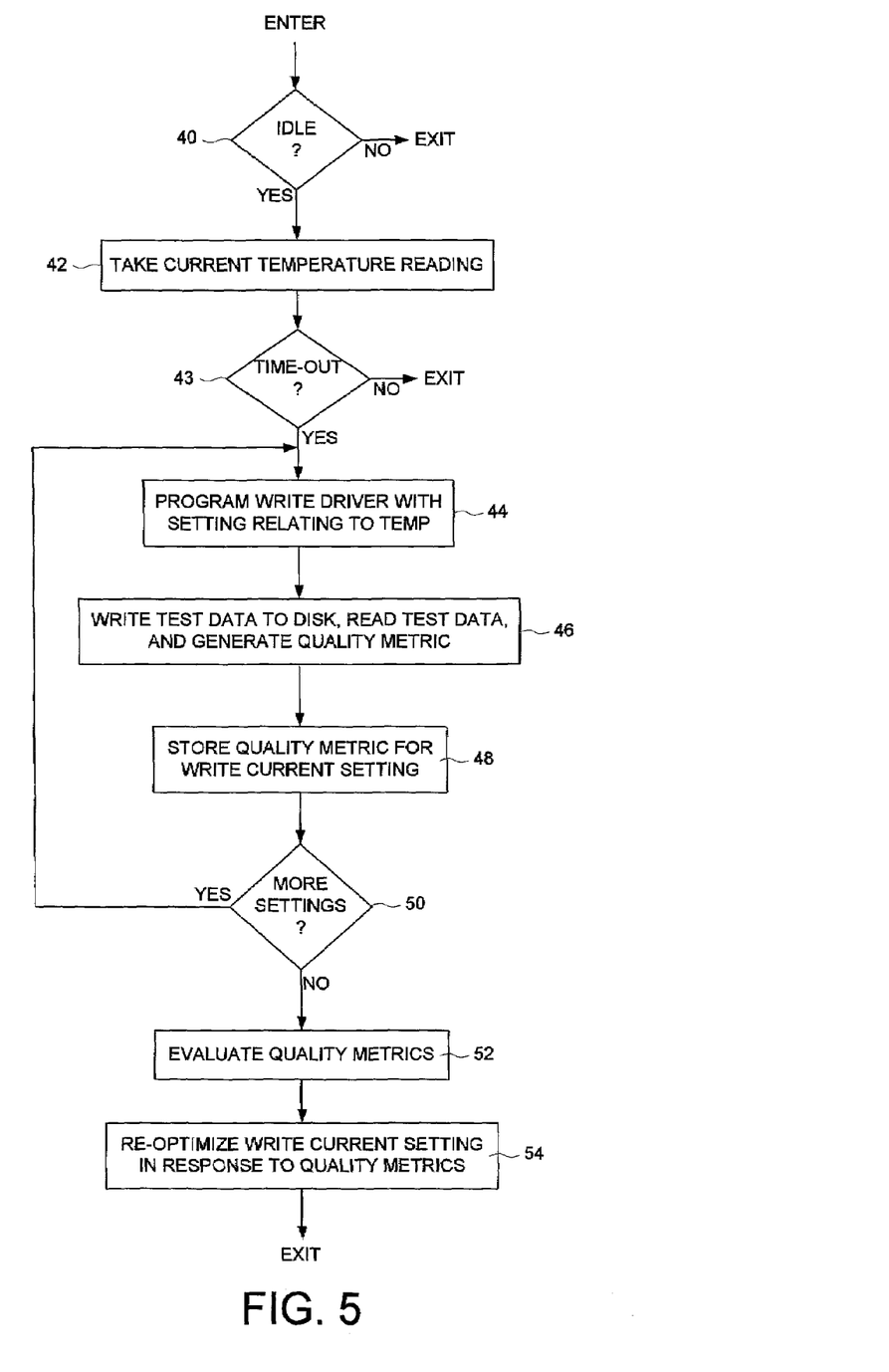
FIG. 5 is a flow diagram illustrating a write current optimization procedure executed during an idle mode of the disk drive according to an embodiment of the present invention.

FIG. 5 is a flow diagram illustrating an embodiment of the present invention wherein the write current optimization procedure is executed by the disk drive in-the-field during an idle mode to compensate for changes in the drive operating characteristics that occur over time (e.g., environmental changes or electrical and mechanical changes). If at step 40 the disk drive is in an idle mode, then at step 42 a current temperature reading is taken from the temperature sensor 24. If at step 43 the write current setting for the current temperature reading had been previously optimized within a predetermined time interval, the optimization procedure exits. Otherwise at step 44 the write driver 10 is programmed with a write current setting relating to the temperature reading (see FIG. 4). At step 46 test data is written to and read from the disk to generate a quality metric, and at step 48 the quality metric corresponding to the write current setting is stored. If at step 50 there are more write current settings to try, the process repeats starting with step 44. After generating a quality metric for each of the write current settings, at step 52 the quality metrics are evaluated and at step 54 the optimal write current setting relative to the quality metrics is selected as the re-optimized write current setting used during normal operation. The re-optimized write current setting may be one of the write current settings programmed into the write driver 10 at step 44, or it may be computed for example by interpolating between write current settings programmed into the write driver 10 at step 44.

Figure 6:
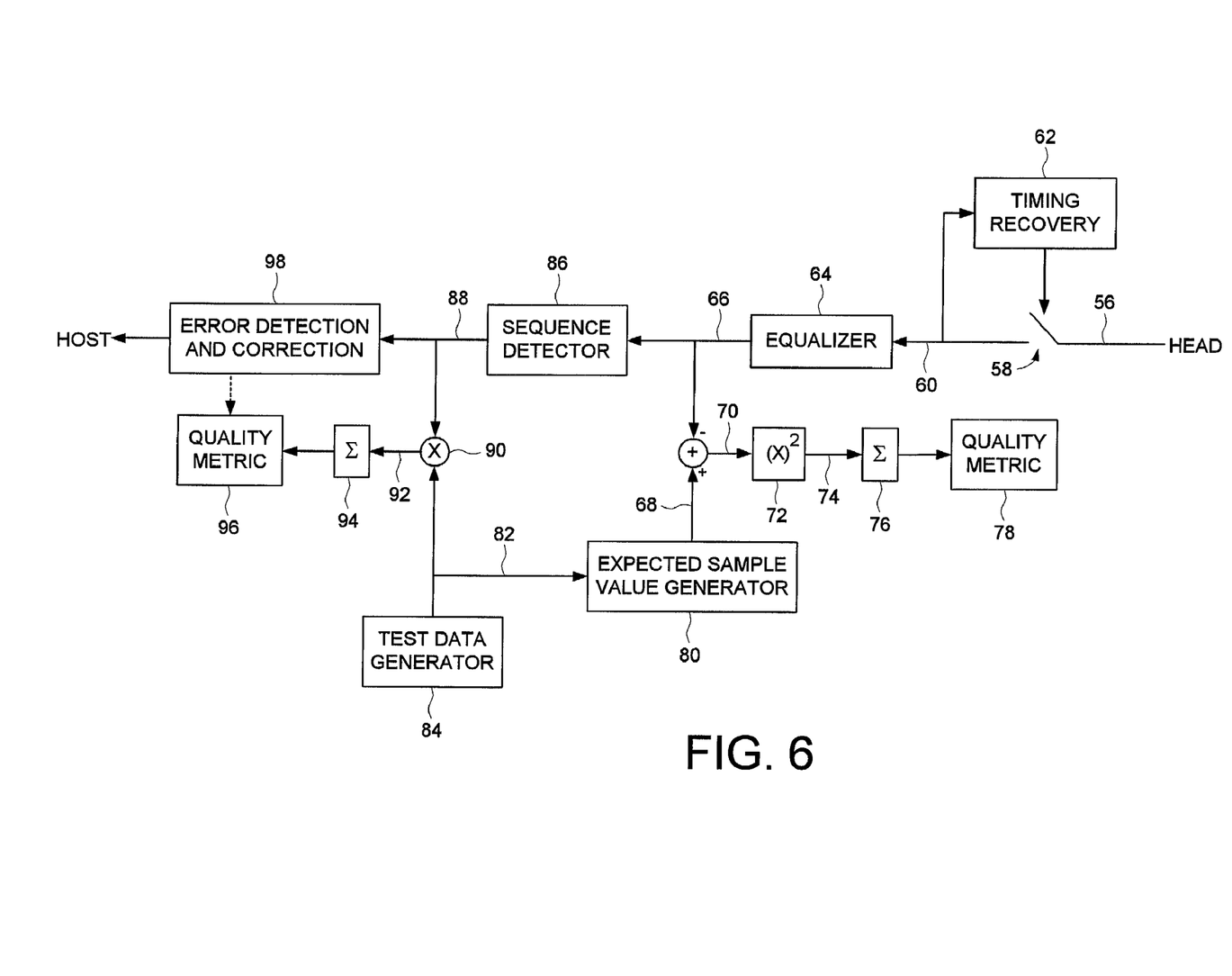
FIG. 6 shows how quality metrics may be generated for optimizing the write current settings according to an embodiment of the present invention.

The quality metrics used to select the operating write current setting may be generated in any suitable manner. FIG. 6 shows two examples of how quality metrics can be generated within a disk drive employing a sampled amplitude read channel. The read signal 56 emanating from the head 8 is sampled by a sampling device 58 to generate read signal sample values 60. The read signal sample values 60 are processed by a timing recovery circuit 62 in order to synchronize the sampling to a zone data rate. The timing recovery 62 may be implemented in any suitable manner, such as adjusting the sampling frequency of the sampling device 58, or by interpolating the read signal sample values 60. The read signal sample values 60 are equalized by an equalizing filter 64 according to a desired response corresponding to a desired detection algorithm (e.g., partial response maximum likelihood (PRML)). A difference between the equalized read signal sample values 66 and expected sample values 68 is computed to generate a difference value 70. The difference or error is squared 72, and the squared values 74 summed 76 to generate the quality metric 78. In on embodiment, the write current setting which generates the minimum quality metric (e.g., the least mean squared (LMS) error) is selected as the re-optimized write current setting used during normal operation. In the embodiment shown in FIG. 6, the expected sample values 68 are generated by an expected sample value generator 80 in response to the test data 82 generated by a test data generator 84 (which generates the test data 82 written to and read from the disk 4 during the calibration procedure). Techniques for generating expected sample values 68 from a test data sequence are known and not disclosed so as not to obscure the embodiments of the present invention.

The equalized sample values 66 in FIG. 6 are processed by a sequence detector 86 (e.g., a Viterbi detector) to generate an estimated data sequence 88. In one embodiment, the estimated data sequence 88 is compared to the test data 82 (e.g., using an XOR circuit 90) to generate bit errors 92. The bit errors are accumulated (counted) by summing circuit 94 to generate a quality metric 96. In one embodiment, the write current setting which generates the minimum quality metric (the least number of bit errors) is selected as the re-optimized write current setting used during normal operation. In another embodiment, the quality metric 96 representing the number of bit errors is generated by an error detection and correction algorithm 98, such as the well known Reed-Solomon error correction code (ECC). In one embodiment, multiple quality metrics (e.g., both quality metrics 78 and 96 in FIG. 6) are generated and evaluated to select the re-optimized write current setting used during normal operation.

The aspects of the present invention, including the calibration procedure and quality metrics, may be implemented in circuitry, software or a combination of circuitry and software. The disk controller 12 and other circuitry may be implemented in a plurality of integrated circuits or a single integrated circuit. In one embodiment, the temperature sensor 24 is enclosed in a head disk assembly (HDA) for housing the disk 4, head 8, a voice coil motor (VCM) for actuating the head 8, and a preamp circuit (not shown). Any suitable temperature sensor 24 may be employed in the embodiments of the present invention.

In one embodiment, the write current optimization procedure is executed as part of a write-verify procedure which verifies the recoverability of a data sector after being written to the disk. If the write-verify procedure fails, the disk drive may execute the write current optimization procedure and then re-write the data sector to the disk using the re-optimized write current setting. In yet another embodiment, the write current optimization procedure is executed as part of a heroic error recovery procedure wherein a data sector unrecoverable on-the-fly using error correction code (ECC)

circuitry is recovered using various firmware error recovery procedures (e.g., introducing a tracking offset into the servo system). After recovering a marginal data sector using the heroic error recovery procedures, the disk drive may execute the write current optimization procedure and then re-write the errant data sector using the re-optimized write current setting.

Periodically calibrating the write current settings compensates for changes in the drive operating characteristics that occur over time (e.g., environmental changes or electrical and mechanical changes). In effect, the optimized write current settings adapt to the dynamics of the drive operating characteristics which overcomes the problems associated with the static write current settings that are employed in the prior art.

What is claimed is:

1. A disk drive having drive operating characteristics, the disk drive comprising:
   (a) a disk;
   (b) a head actuated radially over the disk;
   (c) a programmable write driver for applying a write current to the head during write operations;
   (d) a disk controller for executing a write current optimization procedure by:
      obtaining an ambient temperature reading;
      programming the write driver with a first write current setting relating to the ambient temperature reading;
      writing test data to the disk;
      reading the test data from the disk and generating a first quality metric;
      programming the write driver with a second write current setting relating to the ambient temperature reading;
      writing test data to the disk;
      reading the test data from the disk and generating a second quality metric; and
      evaluating the first and second quality metrics to generate an optimized write current setting based on the drive operating characteristics and the ambient temperature reading,
      wherein:
         the optimized write current setting for copying to a plurality of disk drives; and
         each of the plurality of disk drives for generating a re-optimized write current setting in response to the optimized write current setting.

2. The disk drive as recited in claim 1, wherein the disk drive further comprises a temperature sensor to obtain the ambient temperature reading.

3. The disk drive as recited in claim 1, wherein the disk controller executes a temperature sensing algorithm to obtain the ambient temperature reading.

4. The disk drive as recited in claim 1, wherein the disk controller executes the write current optimization procedure during a manufacturing process.

5. The disk drive as recited in claim 1, wherein the disk controller executes the write current optimization procedure for a plurality of different temperature readings to generate a plurality of corresponding optimized write current settings.

6. The disk drive as recited in claim 1, wherein:
   (a) the disk controller executes the write current optimization procedure for a plurality of different temperature readings to generate a plurality of corresponding optimized write current settings; and
   (b) the plurality of optimized write current settings are re-optimized for each of a plurality of disk drives.

7. The disk drive as recited in claim 6, wherein:
   (a) the plurality of optimized write current settings are generated in a temperature controlled environment; and
   (b) the plurality of re-optimized write current settings are generated for each of the plurality of disk drives in a non-temperature controlled environment.

8. The disk drive as recited in claim 2, wherein:
   (a) the disk drive comprises a semiconductor memory for storing optimized write current settings;
   (b) the disk controller executes the write current optimization procedure in-the-field based on the drive operating characteristics at the time the write current optimization procedure is executed; and
   (c) the optimized write current setting generated by the write current optimization procedure is used to re-optimize at least one of the optimized write current settings stored in the semiconductor memory.

9. The disk drive as recited in claim 8, wherein the disk controller executes the write current optimization procedure during an idle mode of the disk drive.

10. The disk drive as recited in claim 1, wherein the disk controller selects the first write current setting relative to a previously optimized write current setting that corresponds to the ambient temperature reading.

11. The disk drive as recited in claim 1, wherein the disk controller executes the write current optimization procedure for more than two write current settings.

12. The disk drive as recited in claim 1, wherein:
   (a) the head generates a read signal while reading the test data from the disk;
   (b) the disk drive comprises a sampling device for sampling the read signal to generate read signal sample values; and
   (c) the quality metrics comprise a mean squared error measurement generated relative to the read signal sample values and expected sample values.

13. The disk drive as recited in claim 1, wherein the quality metrics comprise bit errors in an estimated data sequence detected from a read signal emanating from the head while reading the test data from the disk.

14. A method of executing a write current optimization procedure for a disk drive having drive operating characteristics, the disk drive comprising a disk, a head actuated radially over the disk, and a programmable write driver for applying a write current to the head during write operations, the method comprising the steps of:
   (a) generating an ambient temperature reading;
   (b) programming the write driver with a first write current setting relating to the ambient temperature reading;
   (c) writing test data to the disk;
   (d) reading the test data from the disk and generating a first quality metric;
   (e) programming the write driver with a second write current setting relating to the ambient temperature reading;
   (f) writing test data to the disk;
   (g) reading the test data from the disk and generating a second quality metric;
   (h) evaluating the first and second quality metrics to generate an optimized write current setting based on the drive operating characteristics and the ambient temperature reading;
   (i) copying the optimized write current setting to a plurality of disk drives; and
   (j) generating a re-optimizing write current setting for each of the plurality of disk drives in response to the optimized write current setting.

15. The method as recited in claim 14, wherein the disk drive further comprises a temperature sensor for generating the ambient temperature reading.

16. The method as recited in claim 14, further comprising the step of executing a temperature sensing algorithm to generate the ambient temperature reading.

17. The method as recited in claim 14, wherein the write current optimization procedure is executed during a manufacturing process.

18. The method as recited in claim 14, wherein the write current optimization procedure is executed for a plurality of different temperature readings to generate a plurality of corresponding optimized write current settings.

19. The method as recited in claim 14, wherein the write current optimization procedure is executed for a plurality of different temperature readings to generate a plurality of corresponding optimized write current settings, further comprising the step of re-optimizing the plurality of optimized write current settings for each of a plurality of disk drives.

20. The method as recited in claim 19, wherein:
   (a) the plurality of optimized write current settings are generated in a temperature controlled environment; and
   (b) the plurality of re-optimized write current settings are generated for each of the plurality of disk drives in a non-temperature controlled environment.

21. The method as recited in claim 15, wherein the disk drive further comprises a semiconductor memory, further comprising the steps of:
   (a) storing optimized write current settings for the disk drive in the semiconductor memory;
   (b) executing the write current optimization procedure in-the-field based on the drive operating characteristics at the time the write current optimization procedure is executed; and
   (c) re-optimizing at least one of the optimized write current settings stored in the semiconductor memory in response to the optimized write current setting generated by the write current optimization procedure.

22. The method as recited in claim 21, further comprising the step of executing the write current optimization procedure during an idle mode of the disk drive.

23. The method as recited in claim 14, wherein the first write current setting is selected relative to a previously optimized write current setting that corresponds to the ambient temperature reading.

24. The method as recited in claim 14, wherein the write driver is programmed with more than two write current settings corresponding to the ambient temperature reading during the write current optimization procedure.

25. The method as recited in claim 14, wherein the head generates a read signal while reading the test data from the disk, further comprising the steps of:
   (a) sampling the read signal to generate read signal sample values;
   (b) computing a difference between a read signal sample value and an expected sample value to generate a difference value;
   (c) computing the square of the difference value to generate a squared value; and
   (d) summing the squared values to generate the quality metrics.

26. The method as recited in claim 14, wherein the head generates a read signal while reading the test data from the disk, further comprising the steps of:
   (a) detecting an estimated data sequence from the read signal while reading the test data from the disk;
   (b) comparing the estimated data sequence with the test data to generate bit errors; and
   (c) counting the number of bit errors to generate the quality metrics.

* * * * *